Jan. 4, 1966 W. W. DEIGHTON ET AL 3,227,342

TAPE HANDLING APPARATUS

Filed Aug. 13, 1963 3 Sheets-Sheet 1

INVENTORS
WILLIAM W. DEIGHTON &
ANTHONY G. CAPRIO
BY Martin Lukacher
Attorney

INVENTORS
WILLIAM W. DEIGHTON &
BY ANTHONY G. CAPRIO
Martin Lukacher
Attorney

INVENTORS
WILLIAM W. DEIGHTON &
ANTHONY G. CAPRIO
BY Martin Lukacher
Attorney

United States Patent Office 3,227,342
Patented Jan. 4, 1966

3,227,342
TAPE HANDLING APPARATUS

William W. Deighton, Glen Mills, Pa., and Anthony G. Caprio, Cherry Hill, N.J., assignors to Radio Corporation of America, a corporation of Delaware Filed Aug. 13, 1963, Ser. No. 301,773
6 Claims. (Cl. 226—88)

The present invention relates to tape handling apparatus and more particularly to apparatus for guiding a tape with respect to a work station in order to maintain the tape in proper positional relationship with respect to the station.

The present invention is especially suitable for use in magnetic recording apparatus and particularly an apparatus where a magnetic head is used to scan a plurality of record tracks spaced laterally from each other, widthwise across the tape. In such apparatus, the tape desirably should not become misaligned or skewed with respect to the head. The time relationship among signals written on or read from the different record tracks is altered if the tape is skewed as it passes the head. In data recording, the bits which make up a character of digital information are usually recorded separately on different ones of the tracks. When the tape is skewed with respect to the head, the time relationship among the bits of a character recorded on or read from the tape varies. Additional apparatus may then be used to restore the proper time relationship. Moreover, sufficient space is allotted on the tape to accommodate the worst case of skew, thereby reducing the packing density and the amount of information which can be stored on a tape. Higher tape speeds may then be needed to read information from or write information on the tape at a more rapid rate than would otherwise be possible.

Various tape guide configurations have been suggested for guiding the tape past the head so as to reduce skew. However, magnetic tape usually includes a base of plastic material having inherent resiliency. The tape may yield or buckle as it is guided across the head. Even a slight yielding or buckling may cause significant skewing of the tape. The tape is usually driven across the head by a capstan. Run-out in the capstan bearings may also produce significant amounts of skew at the head in spite of the use of known guiding means. Moreover, commerical magnetic tape may not be so accurately slit as to have perfectly straight edges which are free of edge imperfections such as high and low spots. Known tape guide configurations, such, for example, as those which include a guide plate for engaging an edge of the segment of tape in the zone extending across the magnetic head, react to a tape edge imperfection by causing the tape to skew by varying degrees and in different senses depending upon the direction of tape travel.

Accordingly, it is an object of the present invention to provide improved tape handling means wherein the foregoing difficulties and disadvantages are overcome.

It is a further object of the present invention to provide improved means for guiding a tape so as to prevent lateral meandering or skewing of the tape as it passes a work station.

It is a still further object of the present invention to provide an improved tape guiding device for guiding a tape past a magnetic head which substantially eliminates skewing of the tape with respect to the head.

It is a still further object of the present invention to provide improved tape guiding means which is also operative as a brake to stop and hold the tape when the tape is not driven.

It is a still further object of the present invention to provide tape guiding means for guiding a tape which is driven across a magnetic head with a tape drive capstan, which guiding means reduces skewing of the tape at the head in spite of run-out or misalignment of the capstan with respect to the head and which may tend to produce skewing of the tape with respect to the head.

The foregoing and other objects and advantages of the present invention may be obtained (a) by providing a pair of transverse corrugations in a tape on opposite sides of a work station, such as a station at which a magnetic head is positioned, and (b) by indexing one edge of the tape at both positions where the corrugations are provided.

In accordance with an embodiment of the invention, a block having a surface adjacent a face of the tape may be provided with a pair of grooves respectively on opposite sides of the head. Air is evacuated from the grooves, and the tape passing over the surface is sucked into the grooves so that the transverse corrugations are formed in the tape. The transverse rigidity of the tape is increased sufficiently where the tape is transversely corrugated so that the tape does not buckle when force is applied thereto in a transverse direction. The tape may be edge guided by pads which engage the edge of the tape where the corrugations are provided. The tape is then indexed at two points which define a straight line tape path across the head and prevent skewing of the tape wtih respect to the head. A tape edge imperfection may cause a slight amount of skew. Since that skew is reproduced each and every time the same imperfection passes the index points, the reading and writing of information is invariant and there is substantially no skew to cause an error. Transverse corrugations also isolate the tape drive capstan from the head so that run-out of the capstan does not effect the alignment of the head with respect to the section of the tape between the pair of lateral corrugations. The apparatus may also provide a brake which pneumatically stops and holds the tape when it is not driven by the capstan.

The invention itself, both as to its organization and method of operation, as well as additional objects and advantages thereof, will become more readily apparent from a reading of the following description in connection with the accompanying drawings, in which.

Figure 1:
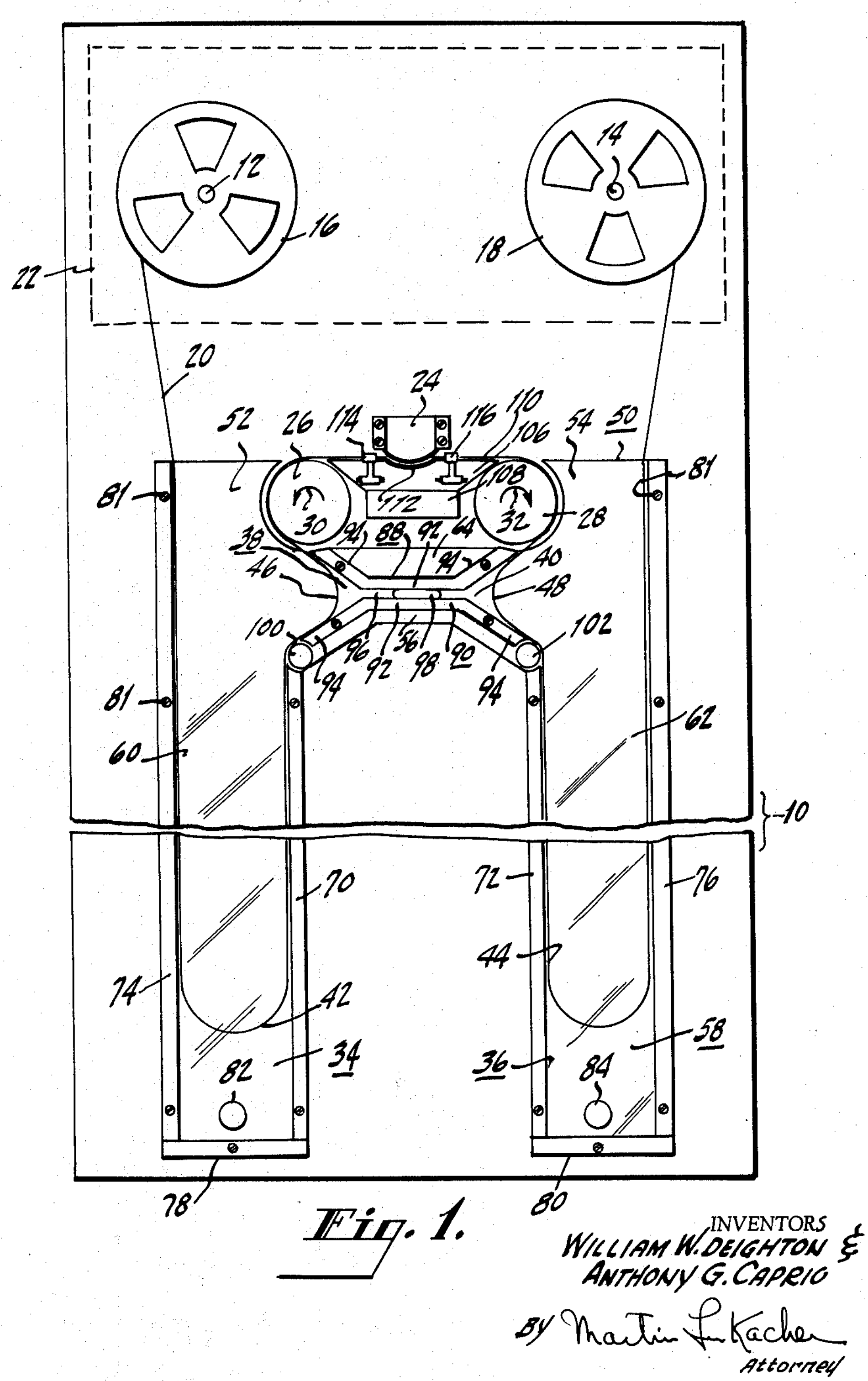
FIG. 1 is a front elevational view diagramamtically showing the tape transport of a computer tape station which embodies one form of the invention.

Referring more particularly to FIG. 1, there is shown an upright panel 10 in which spindles 12 and 14 are mounted. These spindles 12 and 14 are adapted to retain reels 16 and 18 on which a magnetic tape record 20 is wound. The reels may be contained in a cartridge or magazine 22 diagrammatically depicted by the dashed line. The spindles 12 and 14 are coupled to individual drive motors (not shown) which are mounted on the rear or back side of the panel 10. The motors may be reversible so as to drive the reels in opposite directions, either to supply or to take up the tape 20.

A magnetic head 24 is mounted on the panel 10. This head may be of the type used in computer tape stations and has a plurality of head units, each including a gap for scanning a separate record track on the tape 20. The gaps may be disposed in alignment with each other along a line in a direction extending transversely of the tape 20. The tracks are then spaced laterally from each other width-wise across the tape. A pair of capstans 26 and 28 are disposed on opposite sides of the head with their axes parallel to each other. The capstans 26 and 28 may be vacuum capstans which include electromechanically operated valves for communicating a vacuum source, such as a vacuum pump, to apertures at the peripheries of the capstans. The capstans 26 and 28 may be driven continuously but they do not drive the tape unless the valves therein are operated in response to a command in the form of electrical signal levels applied to their respective valves. The capstans rotate at high speed (for example, at a peripheral velocity of 150 inches per second) in opposite directions as indicated by the arrows 30 and 32. Thus, when the valve of the capstan 26 is operated, the tape is brought into engagement with the periphery of the capstan 26 and is rapidly started in a direction from right to left, as viewed in FIG. 1, which is called the forward direction herein. The tape is accelerated practically instantaneously to the peripheral velocity of the capstan. The tape is started and accelerated in the reverse direction when the valve in the other capstan 28 is actuated.

The capstans 26 and 28 are capable of accelerating the tape very much faster than the reels. Accordingly, an arrangement of vacuum receptacles 34, 36, 38 and 40 is provided for forming isolating tape loops 42, 44, 46 and 48, respectively. The receptacles 34 and 36 are main vacuum receptacles in which the relatively larger and longer loops 42 and 44 are provided. The receptacles 38 and 40 are auxiliary receptacles in which the relatively smaller auxiliary loops 46 and 48 are provided.

Tape loop position sensors (not shown) are provided for sensing the position of the tape in the main receptacles 34 and 36 and for providing outputs indicative of the deviation of the positions of the bights of the loops 42 and 46 in these receptacles from a predetermined position. These signals are applied to servo systems for controlling the direction and speed of rotation of the reels 16 and 18 (FIG. 1). Under the control of the servo systems, the reels supply tape to or take up tape from the receptacles 34 and 36 and tend to maintain the loops 42 and 44 in the receptacles at a predetermined position and, therefore, a predetermined size. Such position sensors and servo systems are known in the art and are therefore not described in detail herein.

The receptacles 34, 36, 38 and 40 may have a common rear plate 50 which may be mounted on the panel 10 by means of stand-offs (not shown), so that the reels 16 and 18, the capstans 26 and 28, and the head 24 are at the same level beyond the panel 10. Separate rear plates may be used for each receptacle, if desired. The rear plate 50 is somewhat in the form of the letter "H," having vertical legs 52 and 54 and a horizontal connecting arm 56. The vertical legs 52 and 54 have sectors cut away near the upper portions thereof to provide clearance for the capstans 26 and 28. The horizontal arm 56 provides a rear plate for the auxiliary receptacles 38 and 40. The receptacles also have a front plate 58 indicated as being of a transparent material, such as glass or plastic. This front plate has leg sections 60 and 62, respectively over the vertical legs 52 and 54 of the rear plate 50, and a center section 64 over the horizontal arm 56 of the rear plate 50.

The main receptacles 34 and 36 respectively have inner side walls 70 and 72 and outer side walls 74 and 76. The receptacles 34 and 36 also have bottom walls 78 and 80. These walls may be strips of metal, plastic, or the like, having flat parallel edge faces on which the front and rear plates are seated. The side walls 70 and 74, together with the bottom wall 78, form a U-shaped wall structure for the main receptacle 34, and the side walls 72 and 76 and the bottom wall 78 form a U-shaped wall configuration for the other main receptacle 36. The side walls separate the rear plate 50 and the front plate 58 from each other by a distance slightly greater than the width of the tape 20. Screws 81 hold the front plate 58 sections and the side walls on the rear plate 50. The outer side walls 74 and 76 are longer than the inner side walls and extend to the top of the rear plate 50. The openings to the main receptacles 34 and 36 are respectively between the capstans 26 and 28 and the outer side walls 74 and 76. The reels are approximately directly above the openings to the main receptacles. The main receptacles 34 and 36 have ports 82 and 84 near their bottom walls 78 and 80. These ports may be connected through suitable hoses to a vacuum pump, preferably the same vacuum pump as is used for both main receptacles 34 and 36. Threading of the tape into the receptacles is easily accomplished. The tape drops into the main receptacles 34 and 36 and is then sucked into the main receptacles to form the loop 42 and 44 therein, and into the auxiliary receptacles 38 and 40 to form the loops 46 and 48. Both main and auxiliary loop formations occur at the same time. The side faces of the loops 42 and 44 are closely adjacent to the side walls 70, 72, 74 and 76 of the main receptacles 34 and 36, so that the differential in pressure is maintained by the vacuum pump across the bights of the loops 42 and 44.

The auxiliary receptacles 38 and 40 respectively have upper and lower side walls 88 and 90 similar to the strips which form the side and bottom walls of the main receptacles. These side walls 88 and 90 have central sections 92 and end sections 94 which are inclined with respect to the central sections 92 and which form equal internal angles therewith (for example, angles of 155°). The central sections 92 of the side walls 88 and 90 are disposed horizontally on the rear plate 50 parallel to and spaced from each other, and they form a narrow throat 96, through which air is exhausted from the auxiliary receptacles 38 and 40 into a port 98 which extends through the rear plate 50. The port 98 is in the form of a long narrow opening. A hose connected to a fitting (not shown) on the back of the panel 10 may be used to couple the port 98 to a vacuum pump. As mentioned above, the same vacuum pump may be used to exhaust the auxiliary receptacles 38 and 40 and the main receptacles 34 and 36. The end sections 94 of the side walls 88 and 90 taper away from each other from the throat 96 to the open ends of the receptacles 38 and 40. The angle included by these tapered side walls of the receptacles 38 and 40 is desirably an acute angle. An angle of 50° has been found suitable. The tapered side walls make the receptacles funnel-like in shape. The longitudinal axes of the auxiliary receptacles 38 and 40 are perpendicular to the longitudinal axes of the main receptacles 34 and 36.

The open ends of the auxiliary receptacles 38 and 40 are disposed along the inner side walls 70 and 72 of the main receptacles 34 and 36, respectively. The tape is sucked into the receptacles 38 and 40 because of the vacuum established therein and the auxiliary loops 46 and 48 are automatically formed. Manual threading is not required to form these auxiliary loops. The position of the auxiliary loops with respect to the main loops therefore facilitates the threading of the tape.

Because of the tapered relation of the end sections 94 of the side walls 88 and 90, the cross-sectional area of the auxiliary receptacles 38 and 40 along planes perpendicular to the longitudinal axes of these receptacles decreases from the open ends of the respective receptacles toward the throat 96 thereof. The bights of the auxiliary loops 46 and 48 thus vary in size as the bights move along the longitudinal axes of the receptacles 38 and 40. The side faces of the tape are disposed adjacent, and practically touching, the side walls 88 and 90 of the receptacles. Thus, the differential in pressure is established by the vacuum pump across the faces of the tape in the bights of the loops.

Since the bights of the auxiliary loops 46 and 48 vary in size with the longitudinal position of the bights of the loops 46 and 48, the area across which the difference in pressure is established varies in accordance with the longitudinal position of these bights and also with the sizes of the auxiliary loops. The tension in the tape established by the differential in pressure, across the auxiliary loop 46 or the auxiliary loop 48, therefore varies in accordance with the longitudinal positions and sizes of these auxiliary loops. This variation in tension with size causes the loops to tend to be of predetermined size.

The tape is guided between the inner walls 70 and 72 of the main receptacles 34 and 36 and the lower side walls 90 of the auxiliary receptacles 38 and 40 by guides 100 and 102 which may be cylindrical posts. These posts may have orifices through their cylindrical sides through which compressed air may be expelled. This compressed air forms a hydrostatic air bearing over which the tape passes.

A tensioned length of the tape 20 is provided across the head 24 and around the capstans 26 and 28 when the tape is drawn into the auxiliary and main receptacles by suction. A trapezoidal member which provides a guide block 106 is disposed between the capstans 26 and 28 on the opposite side of the tensioned length of tape from the head 24. A support block 108, which is mounted on the panel 10, carries the guide block 106.

The guide block 106 has an upper surface 110 over which the tensioned length of tape passes. This surface may have a recess 112 which is curved concavely complementary to the convex curvature of the pole end of the head 24 which engages the tape 20. The pole end of the head 24 extends into the recess 112, and the tape wraps itself around the pole end of the head 24 sufficiently to provide proper head-to-tape contact.

The guide block surface also functions as a brake when the capstans 26 and 28 are not actuated to engage the tape. The tape is brought into frictional engagement with the surface 110 of the block 106 because of the suction in the grooves. Frictional forces between the tape and the block surface rapidly stop the tape when the tape is not driven by the capstans.

Figure 2:
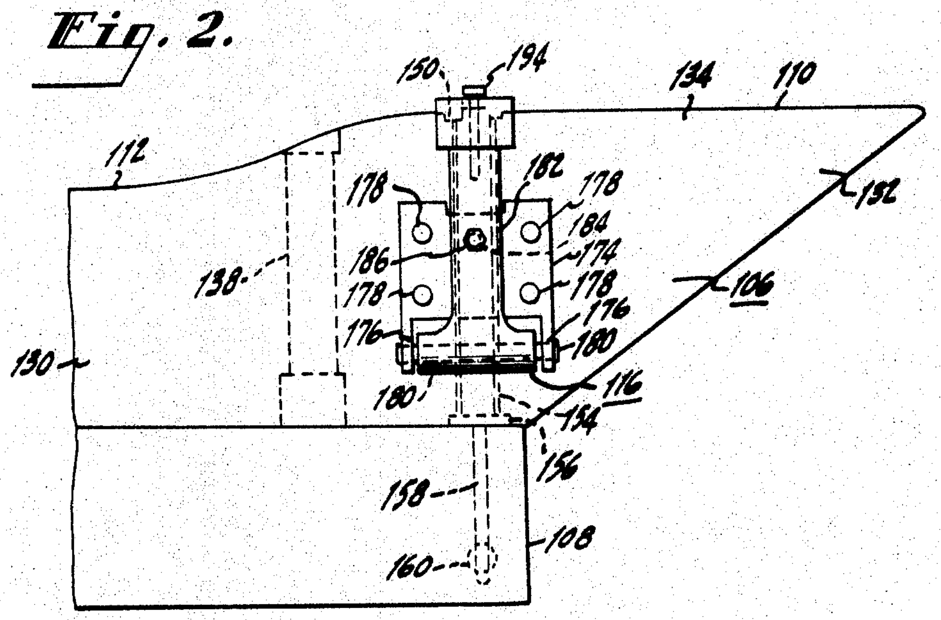
FIG. 2 is an enlarged, fragmentary, elevational view of the tape guiding means of FIG. 1.
Figures 3, 5:
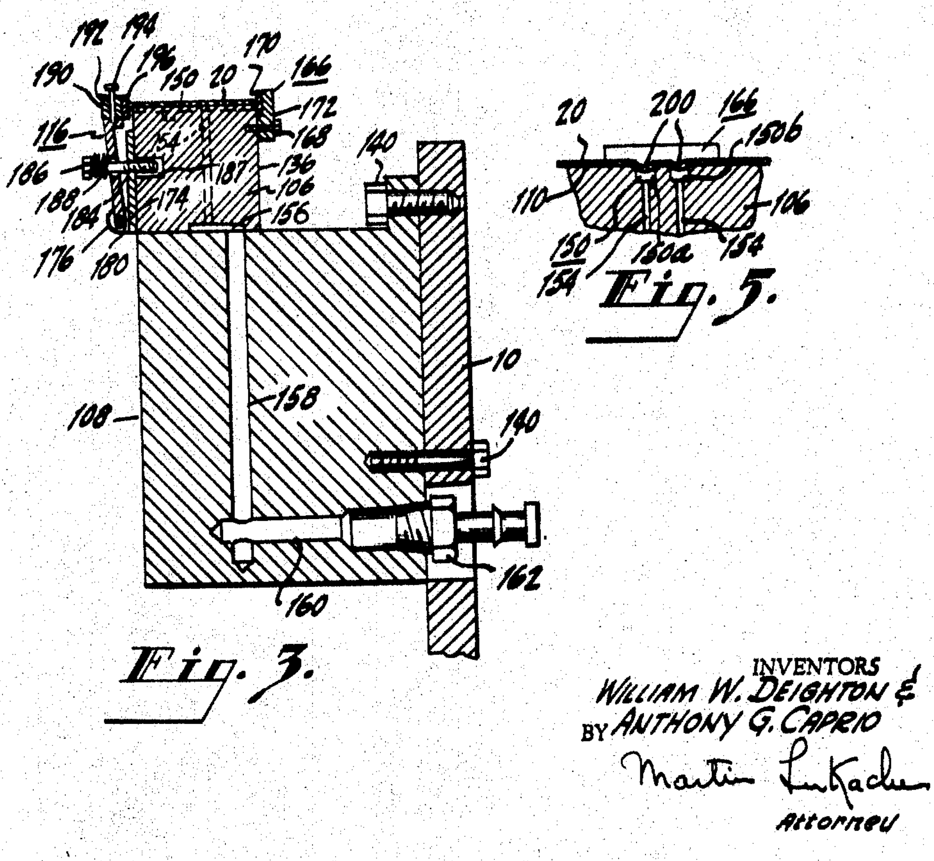
FIG. 3 is a sectional view taken along the line 3—3 in FIG. 4 as viewed in the direction of the appended arrows.
FIG. 5 is an enlarged, fragmentary, sectional view taken along the line 5—5 in FIG. 4 and viewed in the direction of the appended arrows, this figure illustrating the formation of the transverse corrugations in the tape guiding apparatus illustrated in the previous figures.
Figure 4:
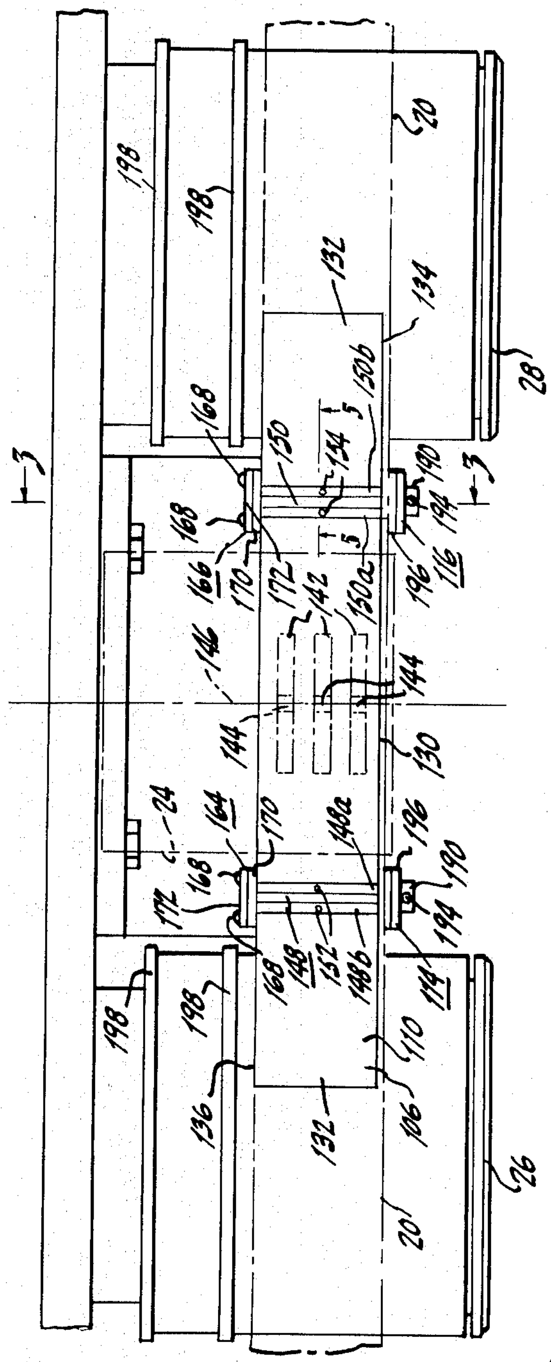
FIG. 4 is a plan view of the guiding apparatus shown in FIG. 3.

The tape guide block 106 is shown in greater detail in FIGS. 2, 3, and 4. The block has a central section 130 and end sections 132 which taper upwardly to an apex near the top surface 110 of the block. The tapering of the ends 132 provides clearance for the capstans 26 and 28 (see FIG. 1). The block 106 is also slightly narrower in width (i.e., between its front side face 134 and its rear side face 136) than the width of the tape 20 (see FIG. 4). The block 106 may also have a vertical hole 138 therein immediately to the right of the recess 112 in the upper surface 110 (FIG. 2). A photo-responsive element (not shown), which may be a part of an end tape sensor device, may be located in the hole 138 or may receive light which passes through the hole 138. The guide block 106 is attached to the support block 108 by means of bolts (not shown). The support block 108 is, in turn, connected to the panel 10 by means of screws 140 (FIG. 3).

The magnetic head 24 includes a plurality of head units 142, the pole tips of three such head units being shown in phantom in FIG. 4. These pole tips have signal gaps 144 in alignment with each other along a common gap line 146.

A first pair of transverse grooves 148 and a second pair of transverse grooves 150 are cut in the upper surface 110 of the block 106. These grooves are all parallel to each other and parallel to the gap line 146. In a tape transport for handling tape one inch wide, each groove may suitably be 0.020 inch deep and 0.080 inch wide. Both pairs of grooves 148 and 150 are equi-distant from the gap line 146; that is, the innermost grooves **148*a* and 150*a* of the pairs 148 and 150 are equi-distant from the gap lines, and the outermost grooves 148*b* and 150*b*** are also equi-distant from the gap line.

A pair of orifices 152 extends through the block 106 into each of the first pair of grooves 148. Another pair of orifices 154 extends upwardly through the block 106 into each of the second pair of orifices. Slots 156 (FIGS. 2 and 3) are provided in the bottom of the block 106 under each pair of orifices 152 and 154. The orifices 152 and 154 enter respective ones of these slots 156. Vertical holes 158 and horizontal holes 160 provide channels through the support block 108, which channels communicate with the slots 156. Fittings 162 for attachment of hoses are mounted in the block 106 and communicate with the ends of the horizontal holes 160. Air may be exhausted by way of the orifices 152 and 154, the slots 156, the holes 158 and 160, the fitting 162 and the hoses, from the grooves 148 and 150 by means of a vacuum pump connected to the hoses.

Two edge guides 164 and 166 are separately attached to the rear side face 136 of the block 106, as by screws 168, and extend above the upper surface 110 of the block 106. The edge guide 164 is disposed adjacent to the first set of grooves 148 and the edge guide 166 is disposed adjacent to the second set of grooves 150. The edge guides 164 and 166 also extend longitudinally on opposite sides of the grooves 148 and 150. Each of the guides 164 and 166 includes a pad 170 of hard material, such as sapphire, which actually engages the edge of the tape and a notched member 172 (FIG. 3) in which the pad 170 is seated. The pad 170 may be cemented to the notched member.

Two edge guides 114 and 116 are disposed on the front side face 134 of the block 106 and are disposed respectively opposite to the edge guides 164 and 166. The front edge guides 114 and 116 may be similar. The guide 116, shown in detail by way of example in FIGS. 2 and 3, includes a bracket 174 having spaced ears 176 which project outwardly from the front face 134 of the member 106 and on which the bracket 174 is held by screws 178. A pin 180 extends through and between the ears 176. An arm 182 is journaled and pivotally mounted on the pin 180. The arm 182 has a central hole 184 through which passes a bolt 186 which is threaded into the bracket 174 and then extends into a clearance hole 187 in the block 106. A compression spring 188 having a diameter larger than the hole 184 and smaller than the head of the bolt 186 is disposed around the bolt 186 between the head of the bolt and the arm 182. The spring 188 biases the arm 182 toward the front face 134 of the guide block 106. The bolt 186 may be screwed into and out of the bracket 174 thereby adjusting the compression of the spring 188 and the biasing force on the arm 182.

A T-shaped member 190 having a vertical hole 192 therethrough is pivotally mounted on top of the arm 182 by means of a pin 194 which extends through the hole 190 into the arm 182. A pad 196 of a hard material, such as sapphire, is attached, as by cementing, to that face of the T-shaped member 190 which is opposite the front side face of the block 106. The pad 196 extends upwardly beyond the upper surface 110 of the block 106 and is opposite to the pad 170 of the edge guide 166. The pad 170 is of equal length in the direction longitudinally of the block to the length of the pad 196 and the edges of the pad 170 are coextensive with the edges of the pad 196. Since the pad 196 is pivotally mounted about the axes of pins 194 and 180, which axes are perpendicular to each other, the pad 196 aligns itself with the edge of the tape 20. The pad 196 biases the tape 20 where the tape passes over the second pair of transverse grooves 150 against the pad 170 of the rear edge guide 166. The edge guide 114 is similar to the edge guide 116 and biases the edge of the tape where the tape passes the first pair of transverse grooves 148 against the rear edge guide 164. Thus, the tape is indexed at the edge guide 164 and the edge guide 166, respectively on opposite sides of the head 24.

Magnetic tape, such as the tape 20, is often made of plastic material, such as a polyester plastic like "Mylar." This plastic material is resilient and can buckle when lateral forces are applied thereto, as by means of the spring biased edge guides 114 and 116. Such buckling would interfere with accurate tape guidance, since the position of all points transversely across the tape where the tape is indexed would be uncertain. The tape is stiffened transversely to a degree sufficient to prevent such buckling, by providing transverse corrugations in the tape. These transverse corrugations are formed in the grooves 148 and 150. FIG. 5 illustrates the formation of the corrugations in the grooves 150 by way of example. When air is exhausted from the grooves through orifices 152 and 154, a difference in pressure is established across the opposite sides of the tape where the tape passes over the transverse grooves 150*a* and 150*b*, as shown in FIG. 5. Transverse corrugations 200 are then formed in the tape. The tape is stiffened by reason of these transverse corrugations and may be indexed accurately against the rear edge guides 164 and 166 without buckling. Since the tape is guided at two points on opposite sides of the head, lateral meandering of the tape and skewing of the tape as it passes over the head is substantially reduced. A tensioned length of tape is provided across the guide block by the vacuum receptacles 34, 36, 38 and 40 (FIG. 1) and by the one or the other of the capstans 26 and 28, when either capstan drives the tape across the block 106. This length of tape is accurately indexed with respect to the gap line at the two index points defined by the edge guides. It has been found that skewing is appreciably reduced and information packing density may be increased by reason of the accurate guidance of the tape afforded. The passage of an edge imperfection, such as a high or low spot, between either set of guides, always causes the same amount of skew so that the reading and writing of information is invariant thereto.

As shown in FIG. 4, a length of tape is provided between the capstan 26 and the first set of grooves 148 and between the capstan 28 and the second set of grooves 150. Should the capstan not run exactly true, that is, run out, as the capstan is driven, for example, by means of belts which extend around the capstans between rims 198 therein, these lengths of tape may laterally meander slightly. However, such lateral meandering is isolated from the section of tape which passes over the head 24 by the transverse corrugations in the tape formed in the grooves 148 and 150.

From the foregoing description, it will be apparent that there has been provided improved tape handling apparatus which facilitates accurate guidance of a tape past a magnetic head. The invention may also be used to provide for accurate tape guidance generally past work stations of various types, such as stations at which other transducers than magnetic heads may be located. Aspects of the invention may be applicable to the handling of films and webs other than tapes and therefore the term "tape" should be taken to include such films and webs where appropriate. Although only one embodiment of the invention has been described for purposes of illustration, variations and modifications therein, within the scope of the invention, will, undoubtedly, become apparent to those skilled in the art. Accordingly, the foregoing description should be taken merely as illustrative and not in a limiting sense.

What is claimed is:

1. Tape handling apparatus comprising (a) a member having a surface along which a tensioned length of magnetic tape having edge imperfections is adapted to pass, (b) said member having first and second grooves in said surface spaced longitudinally from each other in the direction of passage of said tape, said grooves extending entirely across said surface transversely to the direction of passage of said tape and being parallel to each other, (c) means for forming said tape into a pair of corrugations, each in a different one of said grooves, and (d) indexing means disposed adjacent said grooves for guiding said tape along an edge thereof where said corrugations are formed in substantially the same path every time the same tape edge imperfection passes said grooves, said indexing means including first and second pairs of pads disposed on opposite sides of said member and projecting above said member surface, and a pair of arms provided at said grooves for pivotally mounting one of said pairs of pads for movement away from and toward the other of said pairs of pads for biasing the edge of said tape in substantially the same manner every time the same tape edge imperfection passes said pairs of pads.

2. In magnetic tape apparatus having a magnetic head for scanning a tape having edge imperfections, the improvement comprising (a) a block having a tape engaging surface, said block and said head being disposed adjacent to each other on opposite sides of said tape, (b) said block having a pair of grooves in said surface spaced longitudinally from each other respectively on opposite sides of said head, said grooves extending transversely and entirely across said surface, (c) means for pneumatically providing transverse corrugations in said tape within said grooves, (d) a first pair of pads attached to one side face of said block where said grooves are disposed and projecting above said surface in a direction toward said head, (e) a second pair of pads disposed along the side face of said block opposite to said one side face, said second pair of pads being respectively disposed opposite to different ones of said first pair of pads, and (f) a pair of arms respectively pivotally mounting different ones of said second pair of pads for movement away from and toward said first pair of pads for biasing the edge of said tape, where said corrugations are provided, into engagement with said first pair of pads in substantially the same manner every time the same tape edge imperfection passes said pairs of pads.

3. In magnetic tape apparatus including a magnetic head for scanning a plurality of record tracks spaced laterally from each other across the width of a tape having edge imperfections, the improvement comprising (a) a pair of vacuum receptacles respectively disposed on opposite sides of said head for forming a pair of tape loops on opposite sides of said head and providing a tensioned length of tape which extends longitudinally across said head, (b) a pair of tape drive capstans respectively disposed on opposite sides of said head along said tensioned length of tape, (c) a tape guide block having a surface disposed along said tensioned length of tape between said capstans, said surface and said head being disposed on opposite sides of said tape, said surface having a recess therein opposite to said head into which said head partially extends.

(d) said block having a first pair and a second pair of transverse grooves extending into and entirely across said surface respectively on opposite sides of said head, said grooves being parallel to each other and parallel to the gap line of said head, (e) said block having orifices therein extending into said grooves through which air can be exhausted from said grooves to thereby suck said tape into said grooves and form in said tape transverse corrugations within said grooves, (f) a first pair of pads attached to one side face of said block where said grooves are provided in said surface and projecting above said surface in a direction toward said head, and (g) a second pair of pads pivotally mounted on the side face of said block opposite said one side face, said second pair of pads being respectively disposed opposite said first pair of pads and being movable toward and away from said first pair of pads for biasing an edge of said tape where said corrugations are formed into engagement with said first pair of pads in substantially the same manner every time the same tape edge imperfection passes said pairs of pads.

4. In magnetic tape apparatus having a magnetic head for scanning a plurality of magnetic tracks spaced laterally from each other across the width of a tape having edge imperfections, the improvement comprising (a) means for maintaining said tape under tension, (b) means for driving said tape past said head, (c) pneumatic means for providing a pair of transverse corrugations in said tape and entirely across said tape respectively on opposite sides of said head, (d) means for indexing said tape at first and second index points on opposite sides of said head and at the positions where said corrugations are provided, said index points defining a tape path across said head which is substantially reproduced every time the same edge imperfection of said tape passes said index points, (e) said index means including a pair of tape edge guides at each of said index points, a first guide of each pair being fixed and the second guide of each pair being biased along a first axis for movement toward and away from said tape in substantially the same manner every time the same tape edge imperfection passes said index points, and (f) one edge guide of each pair further being pivotally mounted for rotation about a second axis perpendicular to said first axis in substantially the same manner every time the same tape edge imperfection passes said index points.

5. In magnetic tape apparatus, the improvement as claimed in claim 4, wherein (f) said first guide in each of said pairs includes a biased arm mounted at said first index position for rotation about said first axis, and a T-shaped member pivotably mounted on top of said arm for movement about said second axis.

6. In magnetic tape apparatus, the improvement as claimed in claim 5, wherein each of said guides includes sapphire pads attached to the face of each of said guides and extending upwardly beyond the upper surface of said tape.

References Cited by the Examiner

UNITED STATES PATENTS

| | | | |
|---|---|---|---|
| 2,726,859 | 12/1955 | Dolamore | 271—59 X |
| 2,778,634 | 1/1957 | Gams | 226—95 |
| 2,837,330 | 6/1958 | Lawrance | 226—95 |
| 2,867,439 | 1/1959 | Heurtier | 242—55.11 |
| 2,994,489 | 8/1961 | Hare. | |

M. HENSON WOOD, Jr., *Primary Examiner.*

ROBERT B. REEVES, *Examiner.*